United States Patent
Sabharwal et al.

(10) Patent No.: US 11,074,303 B2
(45) Date of Patent: Jul. 27, 2021

(54) SYSTEM AND METHOD FOR AUTOMATICALLY SUMMARIZING DOCUMENTS PERTAINING TO A PREDEFINED DOMAIN

(71) Applicant: HCL Technologies Limited, Noida (IN)

(72) Inventors: Navin Sabharwal, Noida (IN); Amit Agrawal, Noida (IN)

(73) Assignee: HCL TECHNOLOGIES LIMITED, Noida (IN)

(*) Notice: Subject to any disclaimer, the term of this patent is extended or adjusted under 35 U.S.C. 154(b) by 292 days.

(21) Appl. No.: 15/984,479

(22) Filed: May 21, 2018

(65) Prior Publication Data

US 2019/0354595 A1 Nov. 21, 2019

(51) Int. Cl.
| | | |
|---|---|---|
| G06F 16/93 | (2019.01) | |
| G06N 3/08 | (2006.01) | |
| G06F 16/951 | (2019.01) | |
| G06F 16/28 | (2019.01) | |
| G06F 16/2457 | (2019.01) | |

(52) U.S. Cl.
CPC ........ *G06F 16/93* (2019.01); *G06F 16/24578* (2019.01); *G06F 16/285* (2019.01); *G06F 16/951* (2019.01); *G06N 3/08* (2013.01)

(58) Field of Classification Search
CPC .. G06F 16/93; G06F 16/24578; G06F 16/951; G06F 16/285; G06N 3/08; G06N 3/0454; G06N 5/022
See application file for complete search history.

(56) References Cited

U.S. PATENT DOCUMENTS

| | | | |
|---|---|---|---|
| 5,857,179 A * | 1/1999 | Vaithyanathan | ...... G06F 16/345 |
| 7,711,737 B2 | 5/2010 | Surendran | |
| 9,547,821 B1 * | 1/2017 | Loreggia | ................ G06N 20/00 |
| 2003/0130837 A1 | 7/2003 | Batchilo et al. | |
| 2005/0091209 A1 * | 4/2005 | Frank | .................... G06F 16/338 |
| 2007/0078889 A1 | 4/2007 | Hoskinson | |

(Continued)

OTHER PUBLICATIONS

Mehdi Allahyari et al ; "A Brief Survey of Text Mining: Classification, Clustering and Extraction Techniques", Jul. 28, 2017, (13 pages).

(Continued)

*Primary Examiner* — Ashish Thomas
*Assistant Examiner* — Yohanes D Kelemework
(74) *Attorney, Agent, or Firm* — Shumaker, Loop & Kendrick, LLP (57) ABSTRACT

Disclosed is a system for automatically summarizing documents pertaining to a predefined domain. A document finder module enables a web crawler to crawl web resources in order to find a plurality of documents. A keyword determination module determines a set of keywords from the plurality of documents and a rank associated to each keyword of the set of keywords. A clustering module clusters the plurality of documents into one or more clusters. A score computation module identifies a subset of the set of keywords for each cluster upon computing a similarity score, corresponding to each keyword, for each cluster. A summary generation module generates a summary for each cluster based on presence of one or more keywords, of the subset, in each document classified in the cluster.

11 Claims, 6 Drawing Sheets

(56) References Cited

U.S. PATENT DOCUMENTS

| | | | |
|---|---|---|---|
| 2009/0006386 A1* | 1/2009 | Tunkelang | G06F 16/245 |
| 2010/0131563 A1* | 5/2010 | Yin | G06F 16/355 |
| | | | 707/794 |
| 2015/0134574 A1 | 5/2015 | Yasin | |
| 2015/0278345 A1* | 10/2015 | Lu | G06F 17/30882 |
| | | | 707/729 |
| 2016/0055259 A1* | 2/2016 | Ghanekar | G06F 16/345 |
| | | | 707/706 |
| 2016/0239761 A1* | 8/2016 | Simard | G06F 3/0482 |

OTHER PUBLICATIONS

Aysa Siddika Asa et. al.; "A Comprehensive Survey on Extractive Text Summarization Technique", American Journal of Engineering Research, vol. 6, Issue 1, p. 226-239 (2017).

* cited by examiner

SYSTEM AND METHOD FOR AUTOMATICALLY SUMMARIZING DOCUMENTS PERTAINING TO A PREDEFINED DOMAIN

CROSS REFERENCE TO RELATED APPLICATIONS

This patent application does not claim priority from any application.

TECHNICAL FIELD

The present subject matter described herein, in general, relates to automatically summarizing documents pertaining to a predefined domain. More particularly, a system and method for automatically summarizing the documents by using Artificial Intelligence (AI) based techniques.

BACKGROUND

In this competitive world, every organization wishes to keep themselves aware and updated on emerging technologies so as to give themselves a competitive edge over others. To do so, users are devoting time on researching about a specific topic (for example, updates on emerging computing technologies) on various commonly available search engines. Examples of the search engines may include, but not limited to, Google™, Bing™ etc. This may help the users to find webpages/blogs/portals that might contain information related to the specific topic. Though search engines, in return, may provide search results based on the query received from the users. However, the search results too depend on its ranking which in turn affected by browsing behaviour of the users. Therefore, it consumes a lot of time as the users have to read thousands of websites, blogs and extract relevant information related to the specific topic. This approach is completely manual and depends on human interest only.

Since knowledge/information about latest technologies is critical for any organization to survive in the market. This time consuming process may lead them onto trouble if any rival organization may extract the information and implement the same in their business operations before them. Therefore, timely extraction of the information may play a very crucial for the success of any organization.

SUMMARY

Before the present systems and methods, are described, it is to be understood that this application is not limited to the particular systems, and methodologies described, as there can be multiple possible embodiments which are not expressly illustrated in the present disclosure. It is also to be understood that the terminology used in the description is for the purpose of describing the particular versions or embodiments only, and is not intended to—limit the scope of the present application. This summary is provided to introduce concepts related to systems and methods for automatically summarizing documents pertaining to a predefined domain and the concepts are further described below in the detailed description.

In one implementation, a system for automatically summarizing documents pertaining to a predefined domain is disclosed. The system may include a processor and a memory coupled to the processor. The processor may execute a plurality of modules present in the memory. The plurality of modules may include a document finder module, a keyword determination module, a clustering module, a score computation module, and a summary generation module. The document finder module may enable a web crawler to crawl web resources in order to find a plurality of documents associated to a plurality of predefined domains. The keyword determination module may determine a set of keywords, relevant to each predefined domain, from the plurality of documents found by the web crawler and a rank associated to each keyword of the set of keywords. In one aspect, the keyword determination module determines the set of keywords and the rank by using at least one keyword extraction algorithm based on text rank. The clustering module may cluster the plurality of documents into one or more clusters by extracting a set of features for each document in order to make Deep Convolution Neural Networks (Deep CNN) learn the association of each document with one or more predefined domains and classifying each document into a cluster based on the set of features learnt by the Deep CNN. The score computation module may identify a subset of the set of keywords for each cluster upon computing a similarity score, corresponding to each keyword, for each cluster. In one aspect, the similarity score may indicate relevance of a keyword with the cluster. The summary generation module may generate a summary for each cluster based on presence of one or more keywords, of the subset, in each document classified in the cluster thereby automatically summarizing documents pertaining to the predefined domain.

In another implementation, a method for automatically summarizing documents pertaining to a predefined domain is disclosed. In order to summarize the documents, initially, a web crawler may be enabled to crawl web resources in order to find a plurality of documents associated to a plurality of predefined domains. Upon finding the plurality of documents, a set of keywords, relevant to each predefined domain, and a rank associated to each keyword of the set of keywords may be determined. In one aspect, the set of keywords may be determined from the plurality of documents found by the web crawler. In one aspect, the set of keywords and the rank may be determined by using at least one keyword extraction algorithm based on text rank. Subsequently, the plurality of documents may be clustered into one or more clusters by extracting a set of features for each document in order to make Deep Convolution Neural Networks (Deep CNN) learn the association of each document with one or more predefined domains and classifying each document into a cluster based on the set of features learnt by the Deep CNN. Post clustering of the plurality of documents, a subset of the set of keywords may be identified for each cluster upon computing a similarity score, corresponding to each keyword, for each cluster. In one aspect, the similarity score may indicate relevance of a keyword with the cluster. After identification of the subset of the set of keywords, a summary for each cluster may be generated based on presence of one or more keywords, of the subset, in each document classified in the cluster thereby automatically summarizing documents pertaining to the predefined domain. In one aspect, the aforementioned method for automatically summarizing the documents may be performed by a processor using programmed instructions stored in a memory.

In yet another implementation, non-transitory computer readable medium embodying a program executable in a computing device for computing device for automatically summarizing documents pertaining to a predefined domain is disclosed. The program may include a program code for enabling a web crawler to crawl web resources in order to find a plurality of documents associated to a plurality of predefined domains. The program may further include a program code for determining a set of keywords, relevant to each predefined domain, from the plurality of documents found by the web crawler, and a rank associated to each keyword of the set of keywords, wherein the set of keywords and the rank are determined by using at least one keyword extraction algorithm based on text rank. The program may further include a program code for clustering the plurality of documents into one or more clusters by extracting a set of features for each document in order to make Deep Convolution Neural Networks (Deep CNN) learn the association of each document with one or more predefined domains and classifying each document into a cluster based on the set of features learnt by the Deep CNN. The program may further include a program code for identifying a subset of the set of keywords for each cluster upon computing a similarity score, corresponding to each keyword, for each cluster, wherein the similarity score indicates relevance of a keyword with the cluster. The program may further include a program code for generating a summary for each cluster based on presence of one or more keywords, of the subset, in each document classified in the cluster thereby automatically summarizing documents pertaining to the predefined domain.

BRIEF DESCRIPTION OF THE DRAWINGS

The foregoing detailed description of embodiments is better understood when read in conjunction with the appended drawings. For the purpose of illustrating the disclosure, example constructions of the disclosure are shown in the present document; however, the disclosure is not limited to the specific methods and apparatus disclosed in the document and the drawings.

The detailed description is given with reference to the accompanying figures. In the figures, the left-most digit(s) of a reference number identifies the figure in which the reference number first appears. The same numbers are used throughout the drawings to refer like features and components.

DETAILED DESCRIPTION

Some embodiments of this disclosure, illustrating all its features, will now be discussed in detail. The words "comprising," "having," "containing," and "including," and other forms thereof, are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise. Although any systems and methods similar or equivalent to those described herein can be used in the practice, the exemplary, systems and methods are now described. The disclosed embodiments are merely exemplary of the disclosure, which may be embodied in various forms.

Various modifications to the embodiment will be readily apparent to those skilled in the art and the generic principles herein may be applied to other embodiments. However, one of ordinary skill in the art will readily recognize that the present disclosure is not intended to be limited to the embodiments illustrated, but is to be accorded the widest scope consistent with the principles and features described herein.

The present invention facilitates to overcome limitations of manual extraction of information/knowledge related to a specific domain or a subject (for example, updates on emerging computing technologies or any other technological domain). The proposed solution describes an Artificial Intelligence (AI) based system that eliminates the need of an end user which manually extracts important knowledge/information or inference from multiple documents available on online or web resources. Examples of the online resources may include, but not limited to, research blogs, vendor sites, published journals. In other words, the proposed system and method facilitates to automatically summarize the documents pertaining to the specific domain without any manual intervention.

In order to summarize the documents, the proposed system is configured to perform two steps i.e. document finder and knowledge summarization. It may be understood that, in the first step, the proposed system is provided with a list of specific subjects for which summary needs to be generated. It may be noted that the list of subjects may include a technological subject or a non-technological subjects. Examples of the technological subjects is at least one of emerging computing technologies in the field of computer programming, Big Data, Block chain etc. Examples of the non-technological subject is at least one of Human resource management process, client relationship guidelines, legal updates etc. To find out the documents relevant to the technological subject, the proposed system enables a web crawler configured to periodically crawl on the online resources and find updates related to the technological subject of interest of the user. The proposed system may further periodically visit the online resources to check whether any web resource has been updated since the last execution of the web crawler. In addition to the above, the proposed system may also search for the documents on a search engine to find any new blogs/websites, other than the online resources, relevant for the technological subject under consideration. This may help the proposed system to keep on adding new resources, to the list of web resources, that may provide the relevant documents.

In the second step, the proposed system summarizes knowledge obtained from the documents found in the first step. To do so, initially, the proposed system obtains a plurality of documents found by the web crawler. Upon receipt of the plurality of documents, the proposed system determines a set of keywords relevant to the technological subject and assign a rank to each keyword according an importance of a keyword in a document. The proposed system may then use a concept of multi-document summarization to summarize the plurality of documents based on a similarity score indicating similarity amongst the plurality of documents. For computing the similarity score, the proposed system uses Artificial Intelligence (AI) based techniques to cluster similar documents upon extraction of Deep Convolution Neural Networks (Deep CNN) features described therein each document. Once the similar documents are clustered together, the proposed system summarizes the similar documents based on presence of highly ranked keywords in sentences and uniqueness of each sentence in the similar documents.

Thus, in this manner, the proposed system automatically summarizes the documents and keep the user informed about the latest updates regarding the updates in technological subject, of interest of the user, without devotion of the user's time on research. While aspects of described system and method for automatically summarizing documents pertaining to a predefined domain may be implemented in any number of different computing systems, environments, and/or configurations, the embodiments are described in the context of the following exemplary system.

Figure 1:
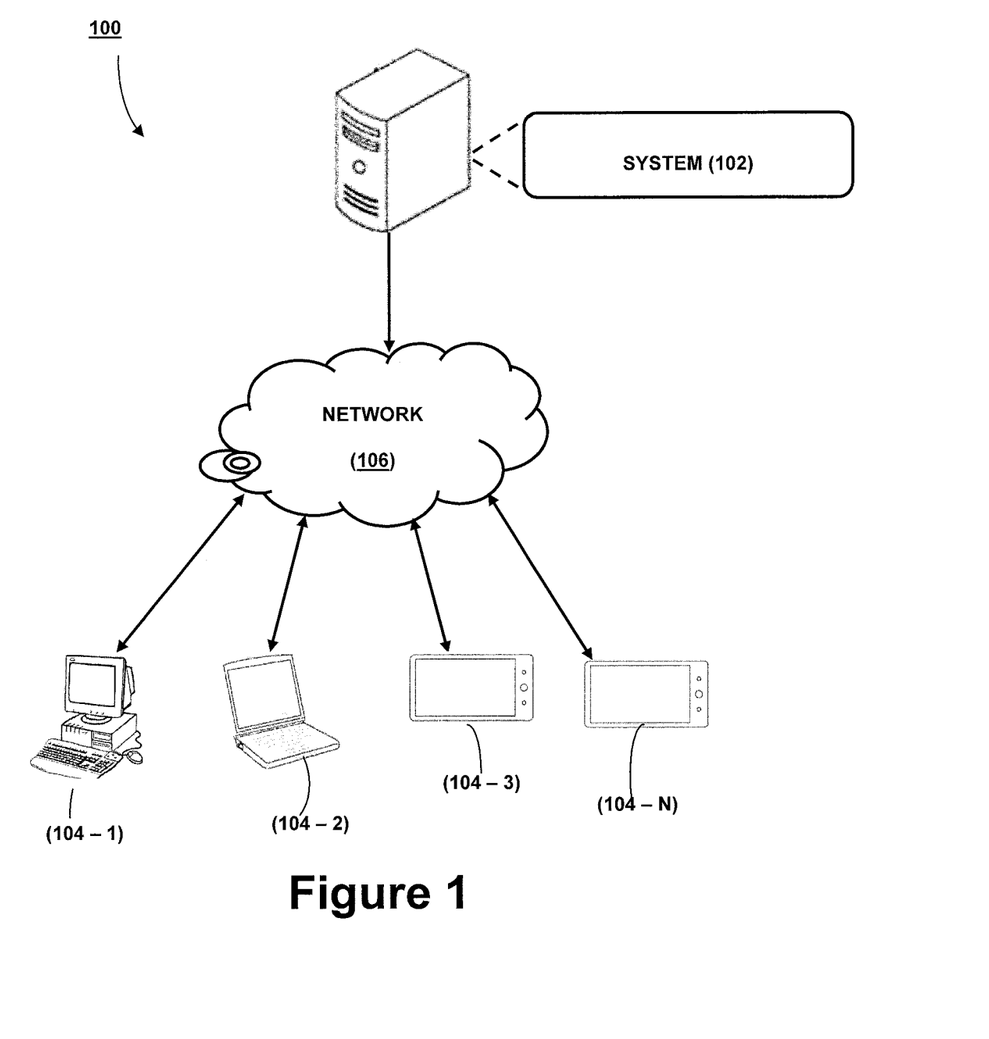
FIG. 1 illustrates a network implementation of a system for automatically summarizing documents pertaining to a predefined domain, in accordance with an embodiment of the present subject matter.

Referring now to FIG. 1, a network implementation 100 of a system 102 for automatically summarizing documents pertaining to a predefined subject is disclosed. In order to summarize the documents, initially, the system 102 enables a web crawler to crawl web resources in order to find a plurality of documents associated to a plurality of predefined domains. Upon finding the plurality of documents, the system 102 determines a set of keywords, relevant to each predefined domain, from the plurality of documents found by the web crawler and a rank associated to each keyword of the set of keywords may be determined. Subsequently, the system 102 clusters the plurality of documents into one or more clusters by extracting a set of features for each document in order to make Deep Convolution Neural Networks (Deep CNN) learn the association of each document with one or more predefined domains and classifying each document into a cluster based on the set of features learnt by the Deep CNN. Post clustering of the plurality of documents, the system 102 identifies a subset of the set of keywords for each cluster upon computing a similarity score, corresponding to each keyword, for each cluster. After identification of the subset of the set of keywords, the system 102 generates a summary for each cluster based on presence of one or more keywords, of the subset, in each document classified in the cluster thereby automatically summarizing documents pertaining to the predefined domain.

In one implementation, the system 102 may use at least one of the below computing techniques for automatically summarizing the documents. The computing techniques may include, but not limited to, Natural Language Processing, Information Retrieval, query refinement techniques (such as domain specific stopword removal, stemming, query expansion), Active Learning and Reinforcement Learning, Term Frequency-Inverse Document Frequency (TF-IDF), and Best Match algorithm.

Although the present disclosure is explained considering that the system 102 is implemented on a server, it may be understood that the system 102 may be implemented in a variety of computing systems, such as a laptop computer, a desktop computer, a notebook, a workstation, a mainframe computer, a server, a network server, a cloud-based computing environment. It will be understood that the system 102 may be accessed by multiple users through one or more user devices 104-1, 104-2 ... 104-N, collectively referred to as user 104 or stakeholders, hereinafter, or applications residing on the user devices 104. In one implementation, the system 102 may comprise the cloud-based computing environment in which a user may operate individual computing systems configured to execute remotely located applications. Examples of the user devices 104 may include, but are not limited to, a IoT device, IoT gateway, portable computer, a personal digital assistant, a handheld device, and a workstation. The user devices 104 are communicatively coupled to the system 102 through a network 106.

In one implementation, the network 106 may be a wireless network, a wired network or a combination thereof. The network 106 can be implemented as one of the different types of networks, such as intranet, local area network (LAN), wide area network (WAN), the internet, and the like. The network 106 may either be a dedicated network or a shared network. The shared network represents an association of the different types of networks that use a variety of protocols, for example, Hypertext Transfer Protocol (HTTP), Hypertext Transfer Protocol Secure (HTTPS), Transmission Control Protocol/Internet Protocol (TCP/IP), Wireless Application Protocol (WAP), and the like, to communicate with one another. Further the network 106 may include a variety of network devices, including routers, bridges, servers, computing devices, storage devices, and the like.

Figure 2:
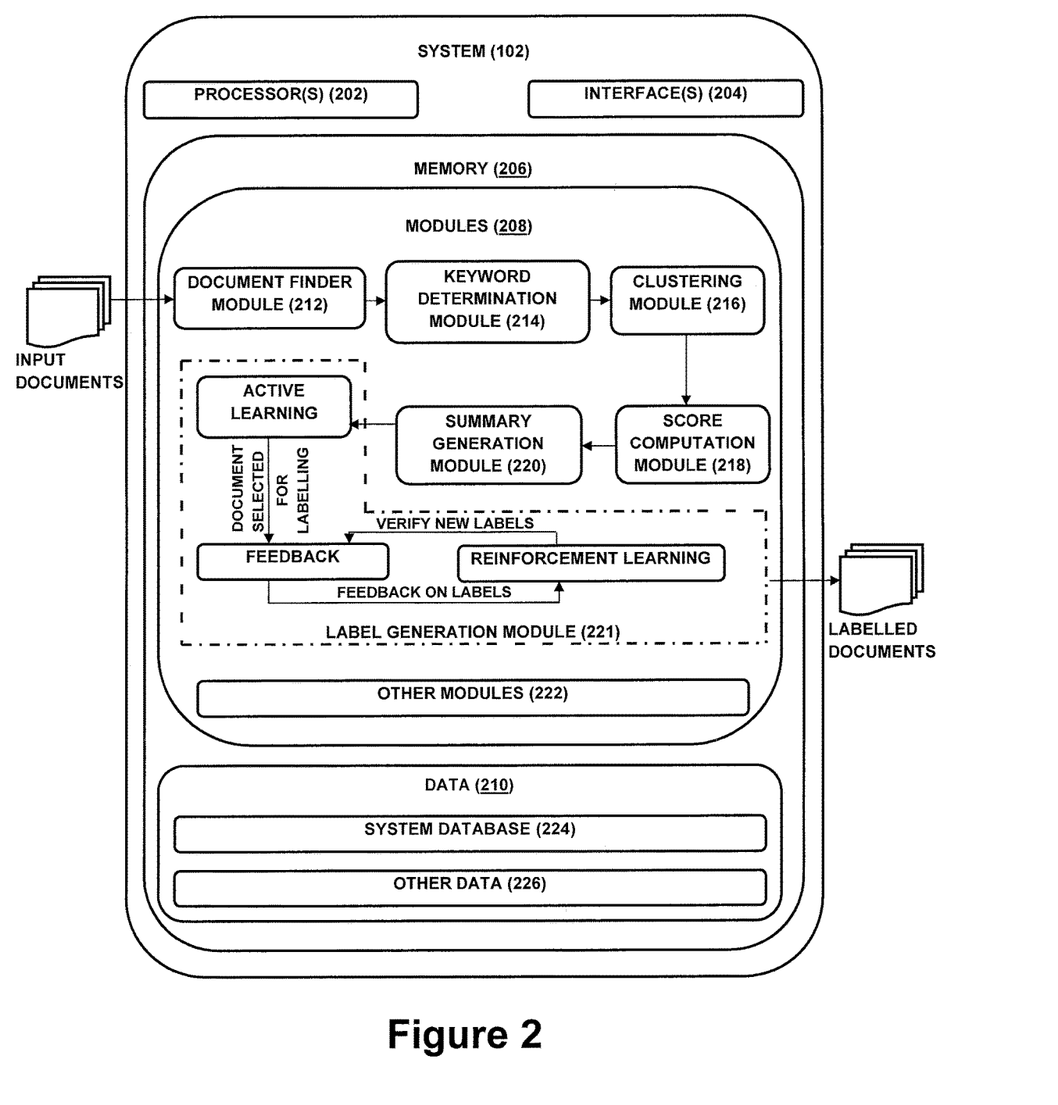
FIG. 2 illustrates the system, in accordance with an embodiment of the present subject matter.

Referring now to FIG. 2, the system 102 is illustrated in accordance with an embodiment of the present subject matter. In one embodiment, the system 102 may include at least one processor 202, an input/output (I/O) interface 204, and a memory 206. The at least one processor 202 may be implemented as one or more microprocessors, microcomputers, microcontrollers, digital signal processors, central processing units, state machines, logic circuitries, and/or any devices that manipulate signals based on operational instructions. Among other capabilities, the at least one processor 202 is configured to fetch and execute computer-readable instructions stored in the memory 206.

The I/O interface 204 may include a variety of software and hardware interfaces, for example, a web interface, a graphical user interface, and the like. The I/O interface 204 may allow the system 102 to interact with the user directly or through the user devices 104. Further, the I/O interface 204 may enable the system 102 to communicate with other computing devices, such as web servers and external data servers (not shown). The I/O interface 204 can facilitate multiple communications within a wide variety of networks and protocol types, including wired networks, for example, LAN, cable, etc., and wireless networks, such as WLAN, cellular, or satellite. The I/O interface 204 may include one or more ports for connecting a number of devices to one another or to another server.

The memory 206 may include any computer-readable medium or computer program product known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 206 may include modules 208 and data 210.

The modules 208 include routines, programs, objects, components, data structures, etc., which perform particular tasks or implement particular abstract data types. In one implementation, the modules 208 may include a document finder module 212, a keyword determination module 214, a clustering module 216, a score computation module 218, a summary generation module 220, and other modules 222. The other modules 222 may include programs or coded instructions that supplement applications and functions of the system 102. The modules 208 described herein may be implemented as software modules that may be executed in the cloud-based computing environment of the system 102.

The data 210, amongst other things, serves as a repository for storing data processed, received, and generated by one or more of the modules 208. The data 210 may also include a system database 224 and other data 226. The other data 226 may include data generated as a result of the execution of one or more modules in the other modules 222.

As there are various challenges observed in the existing art, the challenges necessitate the need to build the system 102 for automatically summarizing documents pertaining to a predefined domain. In one aspect, the predefined domain can be any technological domain or non-technological domain. Examples of the technological domain is at least one of emerging computing technologies in the field of computer programming, Big Data, Block chain etc. Examples of the non-technological domain is at least one of Human resource management process, client relationship guidelines, legal updates etc. To do so, at first, a user may use the user device 104 to access the system 102 via the I/O interface 204. The user may register them using the I/O interface 204 to use the system 102. In one aspect, the user may access the I/O interface 204 of the system 102. In order to summarize the documents automatically, the system 102 may employ the document finder module 212, the keyword determination module 214, the clustering module 216, the score computation module 218, and the summary generation module 220. The detail functioning of the modules is described below with the help of figures.

The document finder module 212 enables a web crawler to crawl web resources in order to find a plurality of documents associated to a plurality of predefined domains. It may be noted that the web resources may include a list of potential sites/research blog. For this, a list of predefined websites may be referred by the document finder module 212 to find the plurality of documents. However, the document finder module 212 may also find documents, pertaining to the plurality of predefined domains, from other related websites/pages or blogs to help the document finder module 212 in finding any new technology updates which in turn will be added to the list of predefined websites.

Once the document finder module 212 finds the plurality of documents, the document finder module 212 find updates related to the plurality of predefined domains present in the plurality of documents and periodically checks whether the website has been updated since last execution of the web crawler.

It may be understood that the plurality of documents found by the document finder module 212 may be related to distinct domains of the plurality of domains. Therefore, in order to automatically generate the summary for each domain, the system 102 is configured to analyze each document and cluster similar documents together thereby classifying the plurality of documents space in specific domains. To do so, the keyword determination module 214 determines a set of keywords from the plurality of documents. It may be understood that the keyword determination module determines the set of keywords that is relevant to each predefined domain. Thereafter, the keyword determination module 214 determines a rank associated to each keyword of the set of keywords. In one aspect, the set of keywords and the rank may be determined by using at least one keyword extraction algorithm comprises Computational linguistic techniques including Term Frequency-Inverse Document Frequency (TF-IDF).

In order to determine the set of keywords, TF-IDF technique is utilized to check importance a candidate word only based on a frequency of the candidate word being appeared in a document. There are situations where the frequency of the candidate word is less in the document leading to a conclusion that the candidate word is not that much important for the document under consideration. However, it might be possible that other important words, determined in the document, are referring to the candidate word and thus making the candidate word an important word/phrase of the document. To extract this kind of linguistic features the keyword determination module 214 uses the at least one keyword extraction algorithm.

Figure 3:
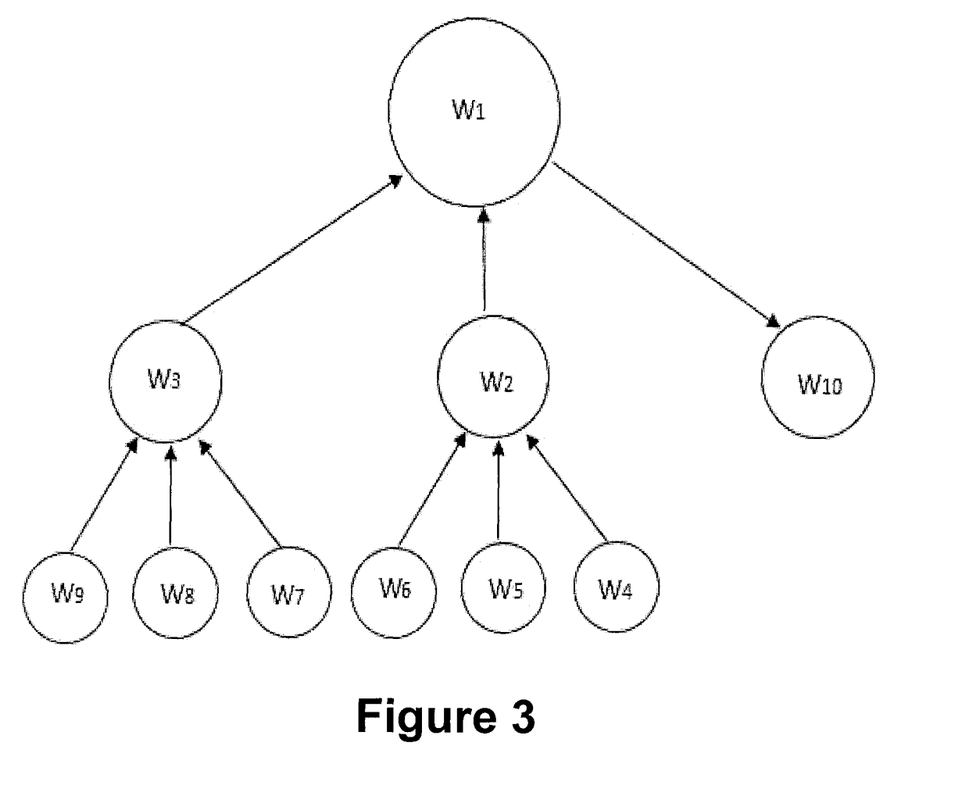
FIG. 3 illustrates an example for determining a rank pertaining to each keyword of a set of keywords, in accordance with an embodiment of the present subject matter.

Referring to FIG. 3. To elucidate the functionality of the keyword determination module 214, consider an example where the importance of a word may be determined by using the at least one keyword extraction algorithm. In the FIG. 3, the size of the circle represents the importance of a given word in a document $D_1$. As can be seen from the figure that although only two words $W_2$ and $W_3$ refer to word $W_1$, then also $W_1$ is linguistically more important than $W_2$ and $W_3$. This is due to the fact that $W_2$ and $W_3$ are important words and thus important words referring to a word makes the referred word more important. One more observation may be seen for $W_{10}$. Although $W_{10}$ is being referred only by one word $W_1$ then also importance of $W_{10}$ is more as it is referred by $W_1$ which in itself is an important word of the document. Thus using this technique, the system 102 may identify important words of the document $D_1$ that are not directly inferred as important and also rank each word based on their importance.

In parallel to the determination of the set of keywords and the rank, the clustering module 216 clusters the plurality of documents into one or more clusters. In one embodiment, the plurality of documents may be clustered into the one or more clusters by extracting a set of features for each document in order to make Deep Convolution Neural Networks (Deep CNN) learn the association of each document with one or more predefined domains. Examples of the set of features may include, but not limited to, Number of title words, Number of phrase relevant to title, sentence location, context meaning of information associated to a document.

Since the system 102 (may also interchangeably be referred to as the AI based system 102) is exposed to a new environment which the AI based system 102 has never undergone before the initial training process, the system 102 spawn software agents which in turn vet system's output for each technology and assign reward points based on system recommendation. It may be noted that each bot uses a Reinforcement Learning method to train the AI based system 102, and these software agents share knowledge in terms of model parameters with other agents to cluster the plurality of documents into one or more clusters. The details of the one or more clusters may then be shared with the users for their feedback to vet assignation of the plurality of documents onto the one or more clusters. The label generation module 221 may then facilitate the users to assign label either as relevant or irrelevant to each of the plurality of documents.

It may be noted that AI based learning algorithm may be trained on this feedback such that the label generation module 221 may automatically assign label (relevant/irrelevant) to new documents. If the label generation module 221 may not be able to find an appropriate label to vet its belongingness to the one or more clusters, the label generation module 221 may use a concept of Active learning to select only few unlabeled documents that may be used to label thousands of unlabeled documents.

In the transfer learning, a pipeline of supervised learning followed by un-supervised learning is used. To implement the supervised learning and thereby the un-supervised learning, the system 102 determines the set of deep features from each document. In one aspect, the system 102 uses neural word embedding for each word and context from content of a document to determine the set of deep features for the document Since the system 102 is provided with the plurality of predefined domains, the system 102 uses the Deep CNN to classify each document based on a predefined domain. Thereafter, the clustering module 216 classifies each document into a cluster based on the set of features learnt by the Deep CNN. In other words, the AI based system 102 is smart enough to find and cluster information which is spread over different blogs/vendor websites. Thus, in this manner, the AI based system 102 learns itself based on its experience without human intervention.

Figure 4:
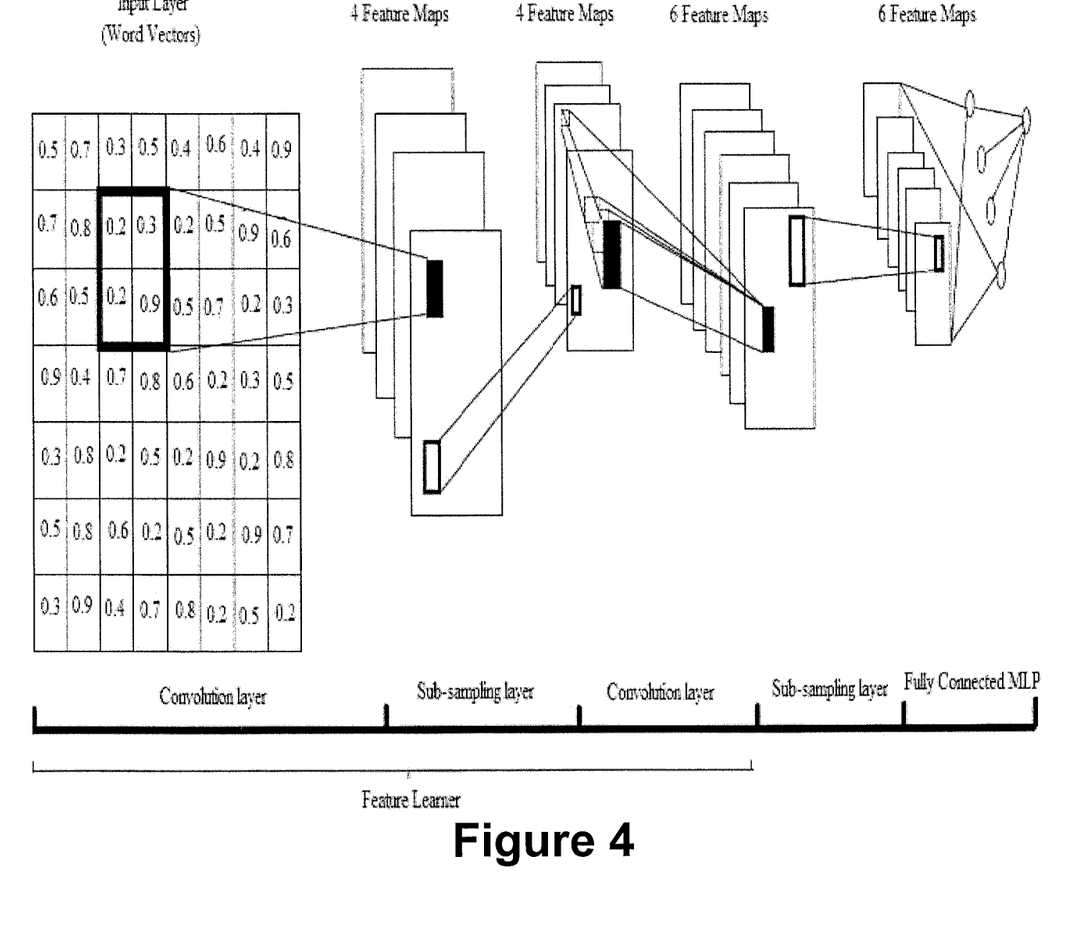
FIGS. 4 and 5 each respectively illustrate a process for clustering a plurality of documents into one or more clusters, in accordance with an embodiment of the present subject matter.
Figure 5:
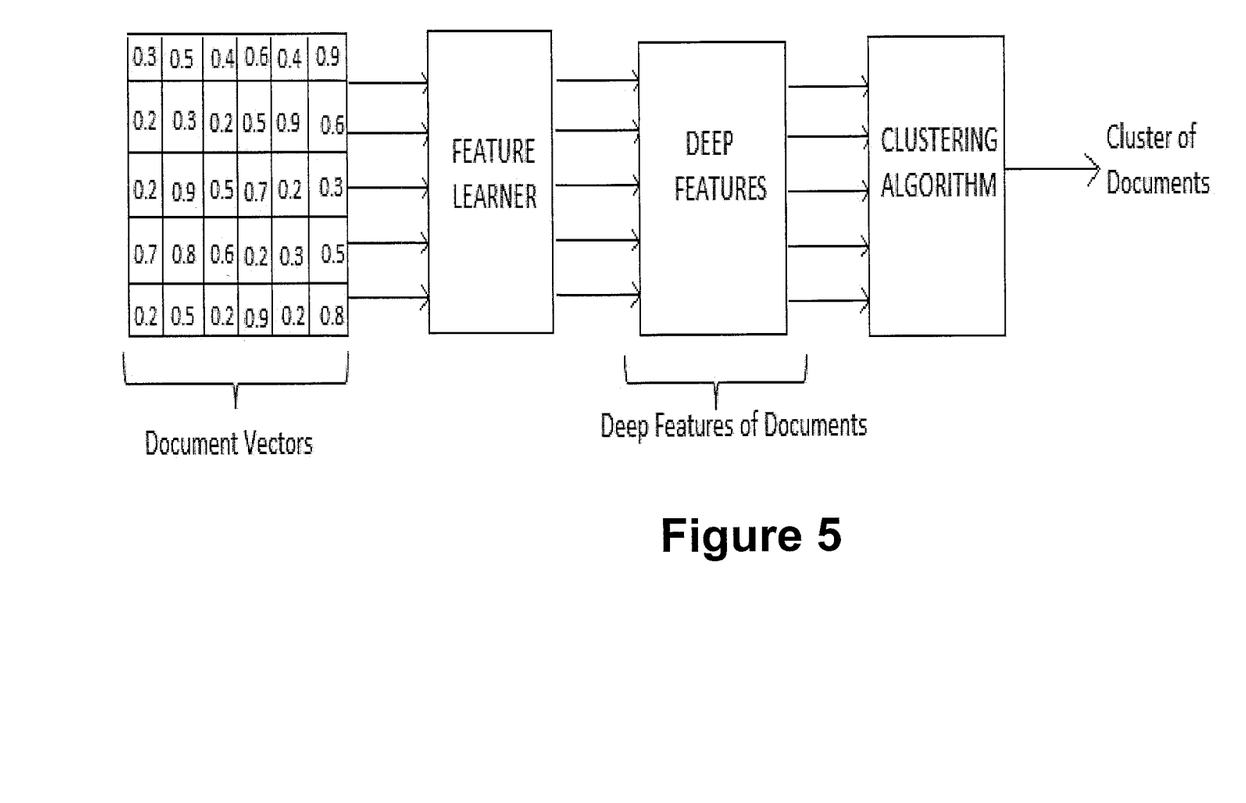

Referring to FIGS. 4 and 5. In order to elucidate the clustering of each of the plurality of documents into the one or more cluster, consider an example as mentioned below. It may be noted that the document vectors are being generated using neural word embedding for each of keyword in a document, as shown in the FIG. 5. These neural word embedding is concatenated to form a single vector in order to represent each document in corpus, as shown in the FIG. 5. Subsequently, these document embedding vectors are being used to generate the set of deep feature using deep CNN model as shown in the FIG. 4. Here, the set of deep features may be referred to as n-gram that is being generated using convolution (or filter) of different sizes, as shown in the FIG. 4. Upon generation of the set of deep features, the system 102 uses the set of deep features to assign new document to existing cluster or create a new cluster based on a confidence score, as shown in the FIG. 5.

Subsequent to the determination of the set of keywords and the clustering of the plurality of documents into the one or more clusters, the score computation module 218 identifies a subset of the set of keywords for each cluster. In one aspect, the subset may be identified upon computing a similarity score, corresponding to each keyword, for each cluster. In one aspect, the similarity score may indicate relevance of a keyword with the cluster. To compute the similarity score, the system 102 may use ensemble of techniques. For example, each word is scored based on the rank determined by the keyword determination module 214, stated above, and a Part of speech score. It may be noted that the Part of speech score is predefined for each keyword. For example, it may be noted that a noun may convey a greater meaning than a preposition or a conjunction. Hence the noun, in each document, may be assigned with a score greater than a score being assigned to the preposition or the conjunction. Thus, in this manner, the subset of the set of keywords may be identified that are relevant for a specific cluster.

Upon identification of the subset of the set of keywords, the summary generation module 220 generates a summary for each cluster based on presence of one or more keywords, of the subset, in each document classified in the cluster. In one aspect, the summary for each cluster may be generated by identifying a set of sentences, from each document classified in the cluster, having the presence of the one or more keywords of the subset. Upon identification of the set of sentences, a confidence score corresponding to each sentence of the set of sentences may be computed. In one aspect, the confidence score may be computed based on a frequency of occurrence pertaining to each of the one or more keywords in the set of sentences and uniqueness of each sentence in the set of sentences. After computing the confidence score, a set of candidate sentences may be determined from the set of sentences based on confidence score and thereby generate the summary based on the set of candidate sentences. Thus, in this manner, the system 102 automatically summarizes the documents pertaining to a predefined domain.

Figure 6:
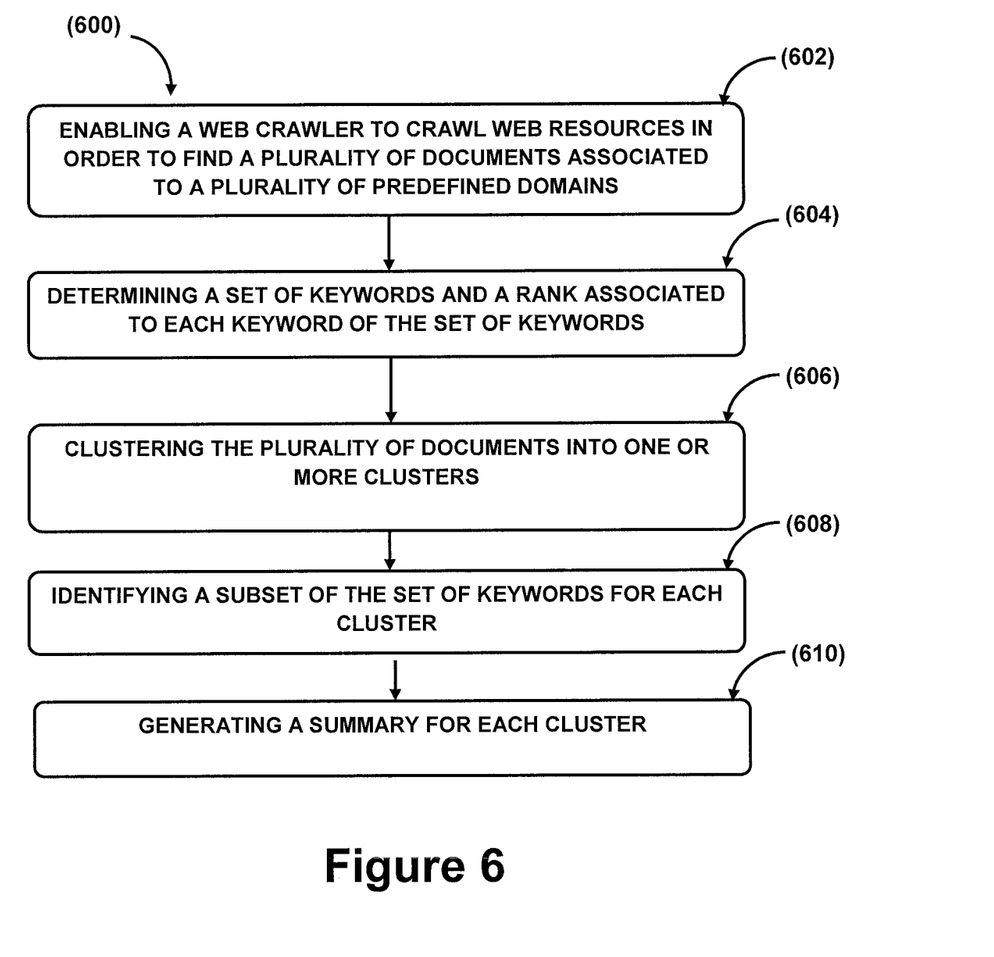
FIG. 6 illustrates a method for automatically summarizing the documents, in accordance with an embodiment of the present subject matter.

Referring now to FIG. 6, a method 600 for automatically summarizing documents pertaining to a predefined domain, in accordance with an embodiment of the present subject matter. The method 600 may be described in the general context of computer executable instructions. Generally, computer executable instructions can include routines, programs, objects, components, data structures, procedures, modules, functions, etc., that perform particular functions or implement particular abstract data types. The method 600 may also be practiced in a distributed computing environment where functions are performed by remote processing devices that are linked through a communications network. In a distributed computing environment, computer executable instructions may be located in both local and remote computer storage media, including memory storage devices.

The order in which the method 600 is described is not intended to be construed as a limitation, and any number of the described method blocks can be combined in any order to implement the method 600 or alternate methods. Additionally, individual blocks may be deleted from the method 600 without departing from the spirit and scope of the subject matter described herein. Furthermore, the method can be implemented in any suitable hardware, software, firmware, or combination thereof. However, for ease of explanation, in the embodiments described below, the method 600 may be considered to be implemented as described in the system 102.

At block 602, a web crawler may be enabled to crawl web resources in order to find a plurality of documents associated to a plurality of predefined domains. In one implementation, the web crawler may be enabled by the document finder module 212.

At block 604, a set of keywords, relevant to each predefined domain, from the plurality of documents found by the web crawler and a rank associated to each keyword of the set of keywords may be determined. In one aspect, the set of keywords and the rank may be determined by using at least one keyword extraction algorithm based on text rank. In one implementation, the set of keywords and the rank may be determined by the keyword determination module 214.

At block 606, the plurality of documents may be clustered into one or more clusters. In one aspect, the plurality of documents may be clustered by extracting a set of features for each document in order to make Deep Convolution Neural Networks (Deep CNN) learn the association of each document with one or more predefined domains and classifying each document into a cluster based on the set of features learnt by the Deep CNN. In one implementation, the plurality of documents may be clustered by the clustering module 216.

At block 608, a subset of the set of keywords may be identified for each cluster upon computing a similarity score, corresponding to each keyword, for each cluster. In one aspect, the similarity score may indicate relevance of a keyword with the cluster. In one implementation, the subset of the set of keywords may be identified by the score computation module 218.

At block 610, a summary for each cluster may be generated based on presence of one or more keywords, of the subset, in each document classified in the cluster thereby automatically summarizing documents pertaining to the predefined domain. In one implementation, the summary for each cluster may be generated by the summary generation module 220.

Exemplary embodiments discussed above may provide certain advantages. Though not required to practice aspects of the disclosure, these advantages may include those provided by the following features.

Some embodiments enable a system and a method to automatically summarize documents pertaining to a predefined subject without any human intervention.

Although implementations for methods and systems for automatically summarizing documents pertaining to a predefined domain have been described in language specific to structural features and/or methods, it is to be understood that the appended claims are not necessarily limited to the specific features or methods described. Rather, the specific features and methods are disclosed as examples of implementations for automatically summarizing the documents.

The invention claimed is:

1. A method for automatically summarizing documents pertaining to a predefined domain, the method comprising:
  enabling, by a processor, a web crawler to crawl web resources in order to find a plurality of documents associated to a plurality of predefined domains;
  determining, by the processor,
    a set of keywords, relevant to each predefined domain, from the plurality of documents found by the web crawler, and
    a rank associated to each keyword of the set of keywords, wherein the set of keywords and the rank are determined by using at least one keyword extraction algorithm based on text rank;
  clustering, by the processor, the plurality of documents into one or more clusters by extracting a set of features for each document in order to make Deep Convolution Neural Networks (Deep CNN) learn the association of each document with one or more predefined domains, and classifying each document into a cluster based on the set of features learnt by the Deep CNN; wherein the set of features are referred as n-gram and are generated using convolution or filter of different sizes,
  identifying, by the processor, a subset of the set of keywords for each cluster upon computing a similarity score, corresponding to each keyword, for each cluster, wherein the similarity score indicates relevance of a keyword with the cluster; and
  generating, by the processor, a summary for each cluster based on presence of one or more keywords, of the subset, in each document classified in the cluster thereby automatically summarizing documents pertaining to the predefined domain and keep the user informed about a latest updates regarding a update in technological subject,
  learning, by the processor, when the system exposed to new environment, wherein learning comprises an active learning and a reinforcement learning, wherein the reinforcement learning is used to train an AI system and agents share information with other agents in terms of model parameters to cluster the plurality of documents into one or more clusters, each bot uses a reinforcement learning method to train the AI system and a label generation module uses the active learning, wherein based on reinforcement learning, details of one or more clusters allow users to provide feedback to vet assignation of the plurality of documents onto the one or mote dusters.

2. The method as claimed in claim 1, wherein the at least one keyword extraction algorithm comprises Computational linguistic techniques including Term Frequency-Inverse Document Frequency (TF-IDF).

3. The method as claimed in claim 1, wherein the similarity score is computed based on the rank, determined, and a Part of speech score predefined for each keyword.

4. The method as claimed in claim 1, wherein the set of features comprises Number of title words, Number of phrase relevant to title, sentence location, context meaning of information associated to a document.

5. The method as claimed in claim 1, wherein the plurality of documents is clustered into the one or more clusters upon applying a Best Match algorithm on information described therein each document.

6. The method as claimed in claim 1, wherein the summary for each cluster is generated by,
  identifying a set of sentences, from each document classified in the cluster, having the presence of the one or more keywords of the subset;
  computing a confidence score corresponding to each sentence of the set of sentences, wherein the confidence score is computed based on a frequency of occurrence pertaining to each of the one or more keywords in the set of sentences and uniqueness of each sentence in the set of sentences;
  determining a set of candidate sentences from the set of sentences based on confidence score; and generating the summary based on the set of candidate sentences.

7. A system for automatically summarizing documents pertaining to a predefined domain, the system comprising:
  a processor; and
  a memory coupled to the processor, wherein the processor is capable of executing a plurality of modules stored in the memory, and wherein the plurality of modules comprising:
    a document finder module for enabling a web crawler to crawl web resources in order to find a plurality of documents associated to a plurality of predefined domains;
    a keyword determination module for determining a set of keywords, relevant to each predefined domain, from the plurality of documents found by the web crawler, and a rank associated to each keyword of the set of keywords, wherein the set of keywords and the rank are determined by using at least one keyword extraction algorithm based on text rank; a clustering module for clustering the plurality of documents into one or more clusters by, extracting a set of features for each document in order to make Deep Convolution Neural Networks (Deep CNN) learn the association of each document with one or more predefined domains, and classifying each document into a cluster based on the set of features learnt by the Deep CNN, wherein the set of features are referred as n-gram and are generated using convolution or filter of different sizes;
    a score computation module for identifying a subset of the set of keywords for each cluster upon computing a similarity score, corresponding to each keyword, for each cluster, wherein the similarity score indicates relevance of a keyword with the cluster; and
    a summary generation module for generating a summary for each cluster based on presence of one or more keywords, of the subset, in each document classified in the cluster thereby automatically summarizing documents pertaining to the predefined domain and keep the user informed about a latest updates regarding a updates in technological subject;

learning, by the processor, when the system exposed to new environment, wherein learning comprises an active learning and a reinforcement learning, wherein the reinforcement learning is used to train an AI system and agents share information with other agents in terms of model parameters to cluster the plurality of documents into one or more clusters, each bot uses a reinforcement learning method to train the AI system and a label generation module uses the active learning, wherein based on reinforcement learning, details of the one or more clusters allow users to provide feedback to vet assignation of the plurality of documents onto the one or more clusters.

8. The system as claimed in claim 7, wherein the score computation module computes the similarity score based on the rank, determined, and a Part of speech score predefined for each keyword.

9. The system as claimed in claim 7, wherein the clustering module clusters the plurality of documents into the one or more clusters upon applying a Best Match algorithm on information described therein each document.

10. The system as claimed in claim 7, wherein the summary generation module generates the summary for each cluster is generated by, identifying a set of sentences, from each document classified in the cluster, having the presence of the one or more keywords of the subset;

computing a confidence score corresponding to each sentence of the set of sentences, wherein the confidence score is computed based on a frequency of occurrence pertaining to each of the one or more keywords in the set of sentences and uniqueness of each sentence in the set of sentences;

determining a set of candidate sentences from the set of sentences based on confidence score; and generating the summary based on the set of candidate sentences.

11. A non-transitory computer readable medium embodying a program executable in a computing device for automatically summarizing documents pertaining to a predefined domain, the program comprising:

a program code for enabling a web crawler to crawl web resources in order to find a plurality of documents associated to a plurality of predefined domains;

a program code for determining a set of keywords, relevant to each predefined domain, from the plurality of documents found by the web crawler, and a rank associated to each keyword of the set of keywords, wherein the set of keywords and the rank are determined by using at least one keyword extraction algorithm based on text rank;

a program code for clustering the plurality of documents into one or more clusters by, extracting a set of features for each document in order to make Deep Convolution Neural Networks (Deep CNN) learn the association of each document with one or more predefined domains, and classifying each document into a cluster based on the set of features learnt by the Deep CNN, wherein the set of features are referred as n-gram and are generated using convolution or filter of different sizes;

a program code for identifying a subset of the set of keywords for each cluster upon computing a similarity score, corresponding to each keyword, for each cluster, wherein the similarity score indicates relevance of a keyword with the cluster; and a program code for generating a summary for each cluster based on presence of one or more keywords, of the subset, in each document classified in the cluster thereby automatically summarizing documents pertaining to the predefined domain and keep the user informed about a latest updates regarding a updates in technological subject;

a program code for learning of the processor when the system exposed to new environment, wherein learning comprises an active learning and a reinforcement learning, wherein the reinforcement learning is used to train an AI system and agents share information with other agents in terms of model parameters to cluster the plurality of documents into one or more clusters, each bot uses a reinforcement learning method to train the AI system and a label generation module uses the active learning, wherein based on reinforcement learning, details of the one or more clusters allow users to provide feedback to vet assignation of the plurality of documents onto the one or more clusters.

* * * * *